US006399001B1

(12) United States Patent
Laatikainen et al.

(10) Patent No.: US 6,399,001 B1
(45) **Date of Patent: *Jun. 4, 2002**

(54) PROCEDURE FOR THE FABRICATION OF A BLANK FOR A STRUCTURAL PRODUCT

(75) Inventors: Aarne Laatikainen, Valko; Jarmo Laitinen, Hyvinkää, both of (FI)

(73) Assignee: Sunds Defibrator Loviisa Oy, Valko (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,002

(22) Filed: Feb. 5, 1998

(30) Foreign Application Priority Data

Feb. 7, 1997 (FI) ............................................... 970529

(51) Int. Cl.[7] ........................... B27N 3/14; B29C 67/02

(52) U.S. Cl. ...................... 264/113; 264/122; 264/125; 264/128; 425/81.1; 425/83.1

(58) Field of Search ............................... 264/113, 122, 264/109, 125, 128; 425/81.1, 83.1

(56) References Cited

U.S. PATENT DOCUMENTS

| | | | | | |
|---|---|---|---|---|---|
| 4,035,120 | A | * | 7/1977 | Eriksson | 425/81 |
| 4,045,528 | A | * | 8/1977 | Urmanov | 264/69 |
| 4,058,580 | A | * | 11/1977 | Flanders | 264/113 |
| 4,063,858 | A | * | 12/1977 | Axer et al. | 425/81 |
| 4,388,055 | A | * | 6/1983 | Ufermann | 425/80.1 |
| 4,440,287 | A | * | 4/1984 | Lund et al. | 198/382 |
| 4,483,668 | A | * | 11/1984 | Poppelreuter | 425/81.1 |
| 5,059,466 | A | * | 10/1991 | Blumer | 428/106 |
| 5,325,954 | A | | 7/1994 | Crittenden et al. | |
| 5,393,214 | A | * | 2/1995 | Irie et al. | 425/81.1 |
| 5,662,227 | A | | 9/1997 | Laitinen | |
| 5,718,786 | A | * | 2/1998 | Lindquist et al. | 156/62.2 |

FOREIGN PATENT DOCUMENTS

| | | | |
|---|---|---|---|
| DE | 2851779 A | | 6/1980 |
| DE | 3731322 | | 3/1988 |
| DE | 9116262 | | 5/1992 |
| DE | 91 16 262.9 | * | 7/1992 |
| DE | 19513306 | | 10/1996 |
| FI | 93806 | | 2/1995 |
| GB | 932927 A | | 7/1963 |

* cited by examiner

*Primary Examiner*—Jan H. Silbaugh
*Assistant Examiner*—Stefan Staicovici
(74) *Attorney, Agent, or Firm*—Birch, Stewart, Kolasch & Birch, LLP

(57) ABSTRACT

Procedure for the fabrication of a blank for a structural product, such as a blank for a structural board, from material (1) comprising longer (L) and shorter (S) particles and possibly also particles (F) smaller than these. The particles are mixed with a binding agent and possible additives and then passed into at least one blank former, from where the particles are brought onto a base (10). Longer particles (L) are brought onto the base (10) to form a first surface layer, onto which is brought at least one layer of smaller particles (F, S), and onto this layer is again brought a layer of longer particles (L) to form a second surface layer, the smallest particles (F) being so brought onto the base that they mainly end up in at least one middle layer in the cross-section of the blank while the amount of the smallest particles (F) diminishes towards the surface layers as seen in the cross-section of the blank. The invention also relates to an apparatus implementing the procedure and to a blank for a structural product.

8 Claims, 4 Drawing Sheets

PROCEDURE FOR THE FABRICATION OF A BLANK FOR A STRUCTURAL PRODUCT

BACKGROUND OF THE INVENTION

Elongated particles, such as chips or fibres, are used in the manufacture of structural products, e.g. boards made of wood material, especially OSB boards (oriented strand board). OSB boards are fabricated from relatively large chips of different lengths, which are scattered in suitable orientations onto a base together with a binding agent and pressed to produce boards. Short chips should mainly be used in the middle layer of the board, while longer chips should be used in the surface layers. This is advantageous in respect of the board properties, e.g. bending strength. The chips in the surface layers are usually oriented in the longitudinal direction, i.e. in the direction of the longer side of the finished product, while the chips in the middle layer are oriented in the transverse direction or they are not given any particular orientation at all. In prior-art procedures for the production of OSB and waferboards, very short chips, obtained e.g. from a chip cutting machine, are screened out from the process because they have caused deterioration of the dimensional stability and strength properties of the end product as well as a high consumption of binding agent. Typically, about 15% of the chips used as raw material are screened out because they are too short to be included in the product. Prior-art scattering/orienting apparatus are not able to fractionate and/or orient the material being scattered well enough to allow very short particles to be utilised in board manufacture. If admitted into the process, very short chips would impair the board quality because they cannot be scattered on the desired part of the board or oriented accurately enough.

SUMMARY OF THE INVENTION

The object of the present invention is to achieve a completely new type of procedure and apparatus as well as a product which make it possible to avoid the existing drawbacks of prior art and thus to utilise even very short particles in the fabrication of structural products, such as boards.

The procedure and apparatus of the invention have numerous significant advantages. The material to be scattered may contain even relatively short particles and they can be scattered on a desired part of the board and, if necessary, oriented. This allows e.g. the raw material to be more fully utilised. Using the apparatus of the invention, the material can be fractionated better than before and therefore better scattering and orienting results are achieved. These circumstances signify that the quality of the final product is also improved. Thus, in the structural product blank of the invention, smaller particles can be used than at present without impairing the strength or rigidity of the product or its stability against deformation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

Figure 1:
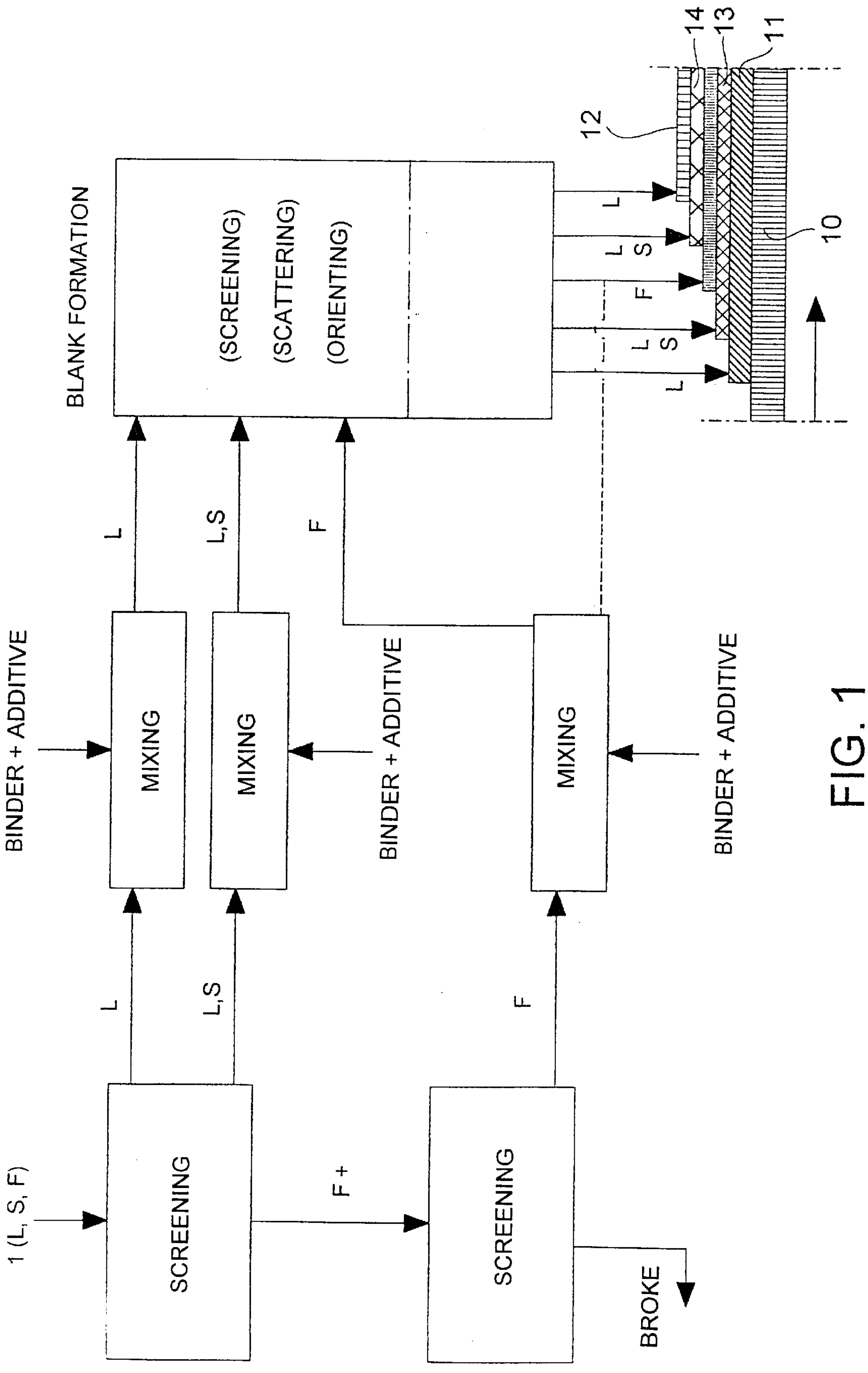
FIG. 1 presents a diagram representing a procedure according to the present invention.

A procedure for the fabrication of a blank for a structural product, such as a blank for structural board, from material 1 comprising longer L and shorter S particles, such as longer and shorter chips and/or fibres, and possibly also particles F smaller than these, in which procedure the particles are mixed with a binding agent and possible additives and then passed into at least one blank former, from where the particles are brought onto a base 10, which can be a moving support, such as a belt conveyor or a mould or a blank coming from a previous apparatus. At first at least one surface layer 11 of longer particles L is brought onto the base 10, and smaller particles F, S are brought onto these to form one or more middle layers 13, 14, upon which longer particles L are again brought to form a second surface layer 12. Thus, the smallest particles F are brought onto the base so that they are mainly placed in a middle layer 13, 14 in the cross-section of the structural product blank and that their amount decreases towards the surface layers 11, 12 as seen in the cross-section of the blank. In the manufacture of structural product blanks, typically three or four blank formers are used, two of which are for the surface layers 11, 12 and one or two for the middle layers 13, 14. From the structural product blank, an actual product is obtained by pressing the blank in a press, thus producing a final product, such as a structural board.

Typically, as seen in the cross-section of the blank, the particle size F,S,L increases from the middle towards the upper and lower surfaces 11, 12.

Particles F,S,L are brought onto the base 10 either oriented or without orientation. The orientation of the particles L,S,F is preferably improved from the middle of the blank towards its upper and lower surfaces 11, 12 as seen in the cross-section of the blank. Typically, the middle layer 13, 14 is transversely oriented relative to the direction of motion of the base while the surface layers are oriented in the longitudinal direction.

The smallest particles F are screened out from the rest of the particles L,S and mixed with a binding agent, whereupon they are brought onto the base either separately or together with larger particles L,S. In previously known solutions, the smallest particles have been screened out from the process altogether. In the procedure of the invention, only part of the smallest particles is rejected while the rest is used in the structural product blank.

Figure 2:
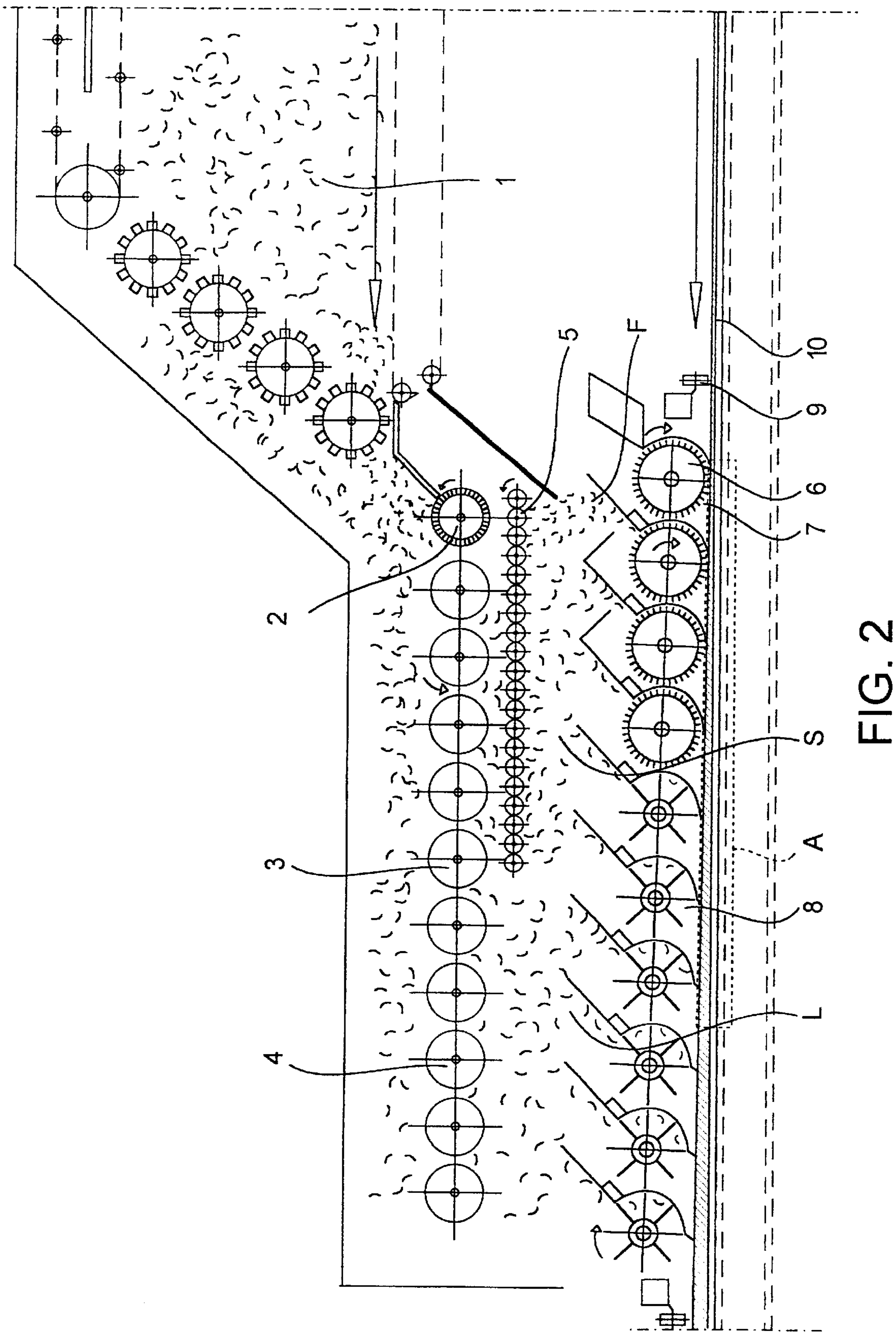
FIG. 2 presents a diagram representing a part of the apparatus of the invention in lateral view.
Figure 3:
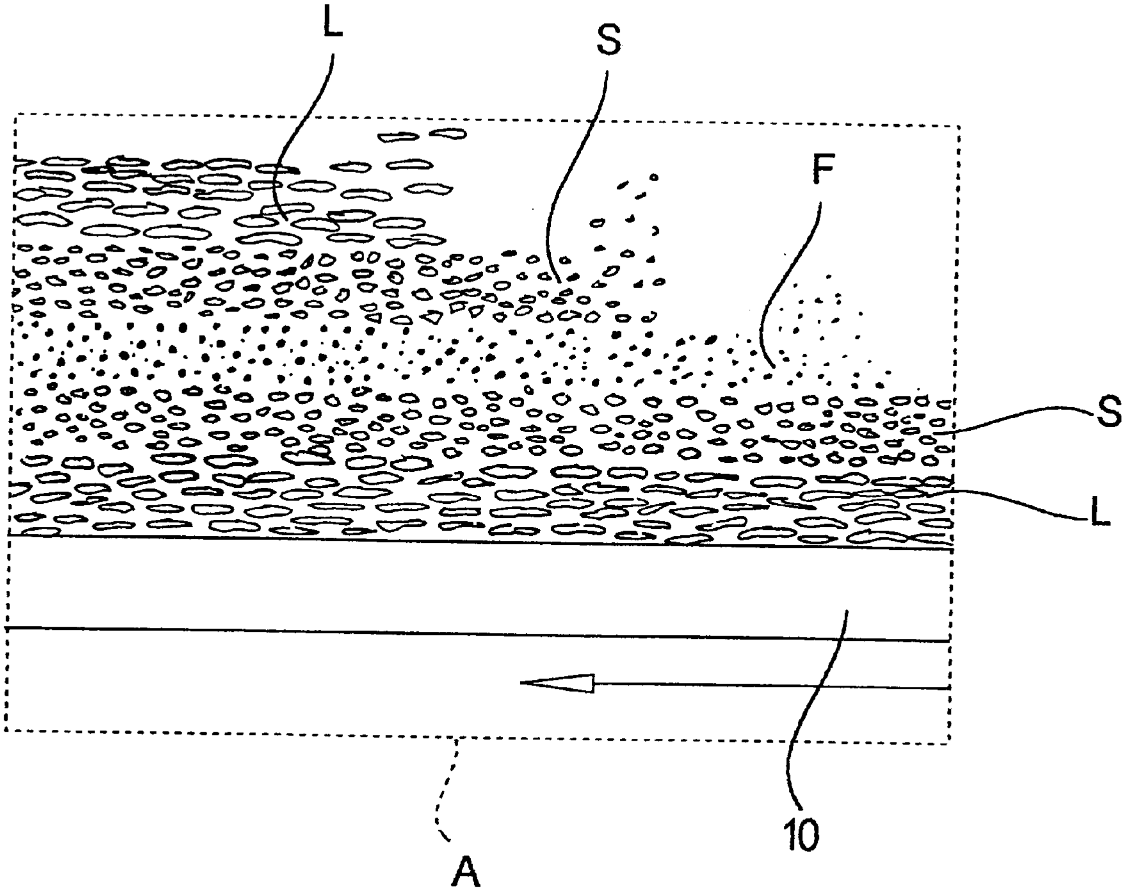
FIG. 3 presents detail A of FIG. 2 in magnified form.
Figure 4:
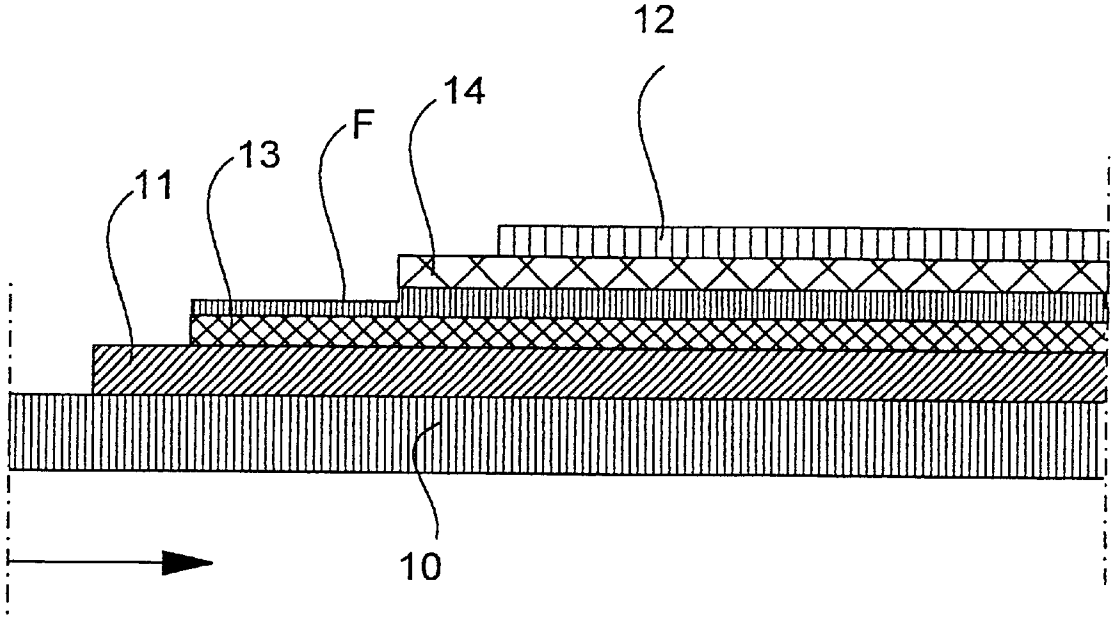
FIG. 4 presents a cross-section of a structural product blank according to the invention.

The structural product blank of the invention is preferably formed by scattering. FIG. 2 presents a blank former.

In the procedure of the invention, the material 1 to be processed is conveyed onto a preliminary, or first, roller set 3,4 in a blank former, to be screened segregated or segregated mainly by particle length. At this stage, most or all of the material being screened falls down below the plane formed by the rollers through the gaps between them. Preferably only part of the material falling down below the set of preliminary rollers 3,4 through the gaps between the rollers is passed onto an intermediate, or second, roller set 5 while the rest of the material is conveyed past the intermediate roller set, preferably via an orienting mechanism 6,7,8, onto a scattering base 10. Of the material passed onto the intermediate roller set 5, mainly the shorter particles, including the shortest, or fine, particles F, and the short particles are passed through the gaps between the intermediate rollers 5 while the longer particles L are passed over the tail end of the intermediate set 5 down below the plane formed by the intermediate rollers 5, preferably via the orienting mechanism 6,7,8, onto the scattering base 10.

The longer particles L are fractionated by length before being oriented and/or scattered. The longer particles L are preferably brought onto the scattering base 10 in longitudinal or transverse orientation relative to the track.

The shorter particles S and the smallest particles F are fractionated by size before being oriented and/or scattered. The shorter particles S and possibly part of the smallest particles F are brought onto the scattering base 10 in either longitudinal or transverse orientation. The smallest particles F are scattered onto the scattering base 10 in such a way that the shorter they are, the closer to the final middle layer of the board to be pressed they will be positioned in the mat formed on the scattering base. FIG. 1 shows one scattering/orienting station. Typically, scattering/orienting stations are used in pairs, one being used to bestrew the lower side of the board and the other to bestrew the upper side. In the case illustrated by FIG. 2, the lower side has already been bestrewn, so the scattering/orienting station in the figure is used to bestrew the upper side.

FIG. 2 thus presents a scattering/orienting apparatus applying the invention, in which the material 1 to be processed, comprising longer L and shorter S particles, preferably such as longer and shorter chips and/or fibres, and possibly even smaller particles F than these, is supplied by means of a feed conveyor onto an accelerating roller 2 rotating at a high speed. The accelerating roller 2 is provided with a suitable rough surface pattern so that it hurls the material to be screened onto a preliminary roller set 3, which consists of at least two substantially parallel rollers, preferably rotating and placed in a substantial horizontal plane with gaps between them, allowing part of the material being processed to fall down through the gaps between the rollers while the rest is passed out via the tail end of the roller set 3, 4. The gaps between the rollers may be individually adjustable, for instance in the way described in patent application FI 922777. In a preferred case, the gap width increases towards the tail end of the preliminary roller set 3, 5. The accelerating roller 2 and the preliminary rollers rotate in the anti-clockwise direction as seen in the drawing. The structure of individual rollers in the preliminary roller set 3, 4 may be e.g. like that described in patent application FI 950518.

Disposed below the preliminary roller set 3, 4 is a set of intermediate rollers 5, extending through at least part of the length of the preliminary roller set from its beginning as seen in the direction of material supply. The intermediate roller set 5 consists of at least two substantially parallel rollers, preferably rotating and placed in a substantially horizontal plane. Between the rollers there are gaps, so that part of the material being processed falls down through the gaps between the rollers while part of it is passed out over the tail end of the roller set. The gaps between the rollers in the intermediate set may also be individually adjustable, e.g. as in patent application FI 922777. In a preferred case, the gap width increases towards the tail end of the preliminary roller set. The rollers may have a patterned surface, which may be a milled, faced, glued or similar type of grooved and patterned surface. The roller set may also consist of so-called disc rollers, in which case each roller is provided with discs disposed or formed at a distance from each other along the axis or relation and having an outer diameter larger than the outer diameter of the rest of the roller. The discs of adjacent disc rollers may be disposed in an interlapping arrangement.

The apparatus of the invention works as follows. The material 1 to be processed is brought to the beginning of the preliminary roller set. The accelerating roller 2 hurls the material onto the preliminary roller set 3, 4, where the rotation and roller structure of the preliminary rollers cause the material to move on. While advancing on the preliminary roller set 3, 4, material of elongated shape tends to be so oriented that even narrow particles cannot fall down through the gaps between the rollers too early. The rotating rollers perform a segregation of the longer and shorter particles. The rollers especially in the upstream end, or forepart, of the preliminary roller set, cause long particles to rise up from the gaps between the rollers, thus preventing them from falling down too soon, whereas shorter particles S, F can fall down through the gaps between the rollers and thus land on the intermediate roller set 5.

The shorter particles, such as chips, are segregated or fractionated by means of the intermediate roller set 5, preferably by size, so that the smallest particles are allowed to fall down through the gaps between the rollers in the upstream end, or fore-part, of the roller set into the space below the rollers while the largest particles fall down via the downstream or tail end of the roller set. The use of an intermediate roller set 5 makes it possible to prevent the longer chips from being intermingled with the shorter chips and, on the other hand, it allows controlled fractionation of the smallest particles.

The apparatus is preferably provided with a chip orienting mechanism 6, 7, 8 placed below the roller sets 3, 4, 5. The orienting mechanism preferably comprises a first set of orienting rollers 6, designed to orient shorter particles S, F, and a second set or orienting rollers 8, designed to orient longer particles L and/or S. The orienting mechanism may also comprise other types of orienting elements besides rollers. It is also possible to use a system that only orients the longer chips, in which case the shorter chips are scattered onto the scattering base without being oriented. In the case illustrated by the figure, the scattering base 10 is a belt conveyor, which moves from the right to the left and may carry on it a blank coming from a previous scattering apparatus.

Disposed in conjunction with the orienting mechanism is at least one detector 9 designed to detect the thickness of the blank on the scattering base 10. Based on the data obtained from the detector 9, the elevation of the orienting mechanism is adjusted. The aim is to keep the orienting mechanism as close as possible to the surface on which particles are scattered, so that the orientation of the particles is preserved as well as possible.

The invention also relates to a structural product blank, such as a blank for a structural board, which has been formed from material comprising longer L and shorter S particles and possibly particles F smaller than these, such as chips and/or fibres, and a binding agent and which consists of two surface layers 11, 12 and at least one middle layer 13, 14 between them. The surface layers mainly contain longer particles while the middle layer mainly contains shorter particles. The middle layer 13, 14 contains the smallest particles F, the amount of which, in the cross-section of the blank, diminishes from the middle towards the surface layers 11, 12.

The particles in the surface layers 11, 12 are typically mainly oriented in the longitudinal direction. The particles in the middle layer are typically mainly oriented in the transverse direction. In a typical case, at least part of the smallest particles is oriented. The structural product blank may naturally be one in which the particles have not been oriented at all but brought onto a base 10 in random orientation during scattering.

The smallest particles are generally smaller than about 25 mm (1"), preferably under 6.25 mm (¼"). The longest particles L are typically 75 mm–150 mm (3"–6") long. The shorter particles are typically under 25 mm–75 mm (1"–3") long. The particle lengths and their distribution in the structural product blank depend on the material used and on the structural product blank and its intended use.

It is obvious to a person skilled in the art that the invention is not restricted to the examples of its embodiments described above, but that it can be varied within the scope of the claims presented below. Thus, the principles applied in making the body of the apparatus, providing the rollers with bearings, driving the rollers, and so on, are considered part of the skilled person's ordinary know-how and will not be described here in detail. The widths of the roller sets, the roller diameters, the numbers of rollers and their speeds of rotation are determined according to the capacity needed and the nature of the material to be processed. The thickness of the layers in the structural product blank and the number of layers as well as the sizes and distribution of the particles in different layers depend, among other things, on the intended use and on the material of the particles and its properties.

What is claimed is:

1. A method for the fabrication of a blank for a structural product, the method comprising the steps of:

a) depositing material comprising particles of different sizes onto a first set of spaced substantially parallel rotating rollers;

b) performing a segregation of the particles using the first set of rollers, whereby shorter particles, including short and shortest particles, fall through the spaces between the rollers, and longer particles pass over the rollers in a direction from an upstream end toward a downstream end of the first set of rollers and fall from the first set of rollers at the downstream end thereof;

c) depositing the shorter particles falling from the first set of rollers onto a second set of spaced substantially parallel rotating rollers;

d) performing a segregation of the shorter particles using the second set of rollers, whereby the shortest particles fall through the spaces between the rollers, and the short particles pass over the rollers in a direction from the upstream end of the second set of rollers toward a downstream end of the second set of rollers and fall from the second set of rollers at the downstream end thereof;

e) depositing the longer particles falling from the first set of rollers onto an orienting mechanism, to thereby generally orient the longer particles in a common direction; and f) depositing, in a predetermined order, (1) the shortest particles falling from the second set of rollers, (2) the short particles falling from the second set of rollers and (3) the oriented longer particles from the orienting mechanism onto a moving support to thereby form superimposed layers of particles on the support, and wherein the outer surface layers are formed by the oriented longer particles, a central layer is formed by the shortest particles and intermediate layers are formed by the short particles.

2. The method according to claim 1, wherein, during step e), the longer particles are oriented in a longitudinal direction that is generally aligned with the direction of movement of the support.

3. The method according to claim 1, wherein the orienting of the longer particles in step e) is performed using a set of orienting rollers.

4. The method according to claim 1, and further comprising the following steps, performed after step d) and before step f):

depositing the short particles falling from the second set of rollers onto an orienting mechanism, to thereby generally orient the short particles in a common direction; and depositing the shortest particles falling from the second set of rollers onto an orienting mechanism, to thereby generally orient the shortest particles in a common direction.

5. The method according to claim 4, wherein the orienting of the short particles and the orienting of the shortest particles is performed using at least one set of orienting rollers.

6. The method according to claim 1, and further comprising the step of mixing the shortest particles with a binding agent.

7. The method according to claim 1, wherein the size of the shortest particles is less than 25 mm.

8. The method according to claim 7, wherein the size of the shortest particles is less than 6.25 mm.

* * * * *